J. L. KELLOGG.
MANUFACTURE OF SHREDDED CEREAL FOOD.
APPLICATION FILED MAY 17, 1915.
1,170,162.        Patented Feb. 1, 1916.
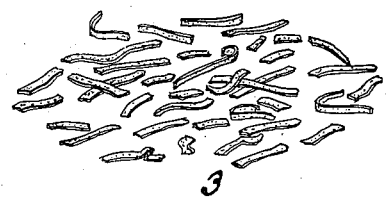
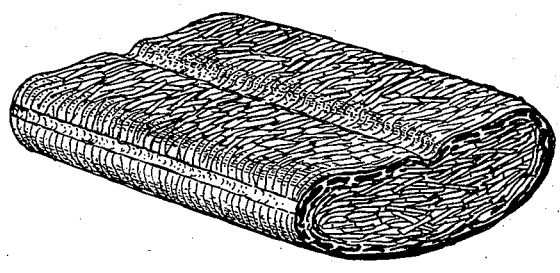
John Leonard Kellogg
INVENTOR
Clarence L. Bryn
ATTORNEY

UNITED STATES PATENT OFFICE.

JOHN LEONARD KELLOGG, OF BATTLE CREEK, MICHIGAN.

MANUFACTURE OF SHREDDED CEREAL FOOD.

1,170,162.   Specification of Letters Patent.   Patented Feb. 1, 1916.

Application filed May 17, 1915. Serial No. 28,586.

*To all whom it may concern:*

Be it known that I, JOHN LEONARD KELLOGG, a citizen of the United States, residing at Battle Creek, county of Calhoun, and State of Michigan, have invented a new and useful Improvement in the Manufacture of Shredded Cereal Foods, of which the following is a specification.

My invention relates to the manufacture of shredded cereal foods from grains, such as wheat, corn, oats, rye and malt, and has for its primary object to provide an improved method of introducing an artificial flavoring into the product, and to make a product having such improved flavoring, which has been thoroughly and completely cooked and aerated, and also having an exceptionally attractive and appetizing form and appearance.

Before my present invention shredded cereal foods such as shredded wheat and shredded wheat biscuit were usually manufactured from the grains without the use of flavoring, the grains being, in one process, boiled for about thirty (30) minutes or until partly cooked, allowed to temper for a few hours and then shredded. It was usually found impossible to cook any saccharine flavoring or salt into wheat, for example, without impairing the shredding qualities of the grain. Wheat, especially, has an outside coating of bran which is impossible to penetrate with a syrup, the syrup sticking to the outside of the berry. When the berry was shredded, it was found that the particles of wheat would not stick together and form a shred on account of the syrup producing an action which would not allow the carbohydrates of the grain to unite. I, therefore, conceived the idea of pulverizing the grain, such as wheat, corn, oats, rye or malt, into a fine flour, mixing therewith the flavoring material, such as sugar, malt extract, salt and water in sufficient quantities to give the flavor desired; mixing the whole into a stiff dough; and forming the same, by preference, into small individual slabs. These slabs were then cooked and dried and broken up into small particles. These particles were then in the preferred process, air dried and placed in the shredding mills and reduced to shreds of, by preference, elongated, ribbon-like form. These elongated ribbon-like shreds were then, in making one product, baked and toasted and broken up to form crisp and tasty short, curly and wavy ribbon like shreds. In making another product, the elongated ribbon-like shreds from the shredding mills were cut up and pressed into biscuit form and baked in special ovens to form light biscuits consisting of the crisp, curly and wavy ribbon-like shreds interlaced and united.

In order that my invention may be fully understood, I shall first describe in detail the mode in which I carry the same into practice.

Reference is to be had to the accompanying drawings forming part of this specification, in which like parts are designated by the same numbers in both figures.

Figure 1 illustrates a sample of curly ribbon-shred cereal food embodying and prepared in accordance with my invention. Fig. 2 illustrates a sample of a curly ribbon-shred cereal food biscuit embodying and prepared in accordance with my invention.

In the preparation of the curly ribbon shred cereal food illustrated in Fig. 1, I first pulverize the grain, which may be whole wheat, corn, oats, rye, malt or other suitable cereal, into a fine flour, preferably on a French bur stone so as to crush but not cut and destroy the texture. To, for example, six hundred pounds of such whole wheat unbolted flour, I add, by preference, two hundred and fifty pounds of water in which I have previously thoroughly dissolved six per cent. of sugar and two per cent. of salt. I then mix the flour in this solution with a rotary mixer very thoroughly for a period of about ten minutes until the mass is a thick, heavy dough. I then by preference break the dough through an ordinary dough breaker, and roll or mold it, preferably, into small individual slabs. In actual practice, I make these slabs about 12" wide, 24" long and 2" or 3" thick. These slabs are then cooked preferably by laying them in ordinary steel trays one on top of the other and placing the trays in an ordinary canner's steam retort and cooking them for about an hour and a half at about fifteen pounds' steam pressure, which gives a temperature of about 250° F.

After cooking, the slabs are by preference piled up in wire racks and allowed to dry in the atmosphere until quite dry. It generally takes from twenty-four to forty hours to accomplish this drying. These cooked and dried slabs are then, by preference, broken up by ordinary swing hammer mills into rough cubes about one inch square, and then by a breaker or a grinder into small particles about the size of a pea or grain of wheat. These particles are then, by preference, passed through a Hess drier or similar drier and a current of dry air delivered through the same until the material is deprived of all surplus moisture and reduced to the proper consistency for shredding. The dried particles are then placed, by preference, in shredding mills of the ordinary kind and shredded so as to form shreds of elongated ribbon-like form. In making one product, these elongated ribbon-like shreds are, by preference, caught on an ordinary conveyer belt and distributed into an ordinary flight oven consisting usually of ten or more flights. The ribbon-like shreds are allowed to drop from one flight to another and so on to the bottom of the oven where the final toasting is accomplished. This product is then, by preference, broken into particles 3 of crisp short, curly and wavy ribbon-like form, as roughly shown in Fig. 1, in which form it is ready for the market. This product, owing to the described process of manufacture, is thoroughly cooked and aerated, is exceptionally palatable and digestible, and owing to its attactive crisp, curly and wavy ribbon-like form, has an exceptionally appetizing appearance. In making this ribbon-like product into biscuit form, the elongated ribbon-like shreds, formed as above described by the shredding mills, are, by preference, gathered upon an endless belt from ten or more shreds, cut and pressed into biscuits and baked in suitable ovens for about thirty minutes at a temperature of from 450° to 500° F. A current of dried air is then, by preference, caused to circulate over and through the biscuits thus formed, thoroughly to dry the same, forming the final product 4, illustrated in Fig. 2, ready for the market. These biscuits owing to the attractive curly and wavy ribbon-like form of their loosely interlaced and united constituent shreds, present an exceptionally appetizing appearance to the eye and possess also the easy digestibility and a peculiarly palatable flavor imparted by this process of manufacture.

I have thus fully set forth the nature of my invention and the mode in which I carry the same into practice. But for a determination of the spirit and scope of my invention, reference is to be had to the following claims:

I claim as my invention:

1. A process of preparing a shredded cereal food during the performance of which the cereal grain is pulverized and mixed with flavoring material and water to form a dough, the dough cooked, dried and broken into small particles, and the particles shredded and baked or toasted.

2. A process of preparing a shredded cereal food, during the performance of which the cereal grain is pulverized and mixed with water to form a dough, the dough molded into cakes or slabs, the slabs cooked, dried, and broken into small particles, the particles shredded and the shreds baked or toasted.

3. A process of preparing a shredded cereal food during the performance of which the cereal grain is pulverized and mixed with water to form a dough, the dough cooked, dried and broken into small particles, the particles shredded into elongated ribbon-like shreds, and the ribbon-like shreds baked or toasted.

4. A process of preparing a shredded cereal food during the performance of which the grain is pulverized by a crushing action, and made into a dough, the dough cooked, dried and broken into small particles, the particles shredded and baked or toasted.

5. A process of preparing a shredded cereal food during the performance of which the grain is pulverized and mixed with water to form a dough, the dough cooked, dried and broken into small particles, the particles air dried and shredded, and the shreds baked or toasted.

6. A process of preparing a shredded cereal food, during the performance of which the grain is pulverized and mixed with water to form a dough, the dough cooked, dried, and broken into small particles, the particles shredded into elongated ribbon-like shreds, and the elongated ribbon-like shreds baked or toasted, and broken into short, crisp, wavy and curly ribbon-like shreds.

7. A process of preparing a shredded cereal food during the performance of which small pieces of a cooked and dried cereal material are shredded into elongated ribbons, and the elongated ribbons toasted and broken into short crisp ribbons.

8. As a new article of manufacture, a shredded cereal food, the elemental shreds of which comprise in their composition cooked cereal and an independent flavoring material.

9. A process of preparing a shredded cereal food during the performance of which small pieces of a cooked and dried cereal material are shredded into elongated ribbons and the elongated ribbons toasted into curly and wavy ribbons, and the latter broken into short pieces.

10. A shredded cereal food consisting of separate, crisp ribbons broken into separate shorter pieces.

JOHN LEONARD KELLOGG.

In presence of—
   CORA H. HUGHES,
   CHAS. M. MARBLE.